Nov. 2, 1926. 1,605,223
H. B. DODGE
SPRING SUSPENSION MECHANISM
Filed Sept. 26, 1923 2 Sheets-Sheet 1

INVENTOR.
Harry B. Dodge
BY
Erwin, Wheeler & Woolard
ATTORNEYS.

Nov. 2, 1926.　　　　　　　　　　　　　　　1,605,223
H. B. DODGE
SPRING SUSPENSION MECHANISM
Filed Sept. 26, 1923　　　2 Sheets-Sheet 2

INVENTOR.
Harry B. Dodge
BY
Erwin, Wheeler & Woolard
ATTORNEYS.

Patented Nov. 2, 1926.

1,605,223

UNITED STATES PATENT OFFICE.

HARRY B. DODGE, OF CLINTONVILLE, WISCONSIN, ASSIGNOR TO THE FOUR WHEEL DRIVE AUTO COMPANY, OF CLINTONVILLE, WISCONSIN.

SPRING-SUSPENSION MECHANISM.

Application filed September 26, 1923. Serial No. 664,847.

This invention relates to improvements in spring suspension mechanism for vehicle bodies, said mechanism being designed particularly for use in connecting the body of a motor driven car, or trailer, to the main springs. The term body is, for the purposes hereof, to be understood as including any spring supported member, such as a box, platform or frame.

The primary objects of this invention are to provide means for allowing lateral vibratory movements of the sub-frame or truck of a car without materially affecting the comfort of passengers carried by the body and to also allow limited pendulum movements of the body in going around curves, thus distributing momentum stresses and reducing the tendency to tip the truck.

More particularly stated, one object is to connect the body to the springs in such a manner that the short lateral jolts and vibrations to which the wheels are subjected under the conditions of ordinary railway or road travel will not be transmitted to the car body, the latter being suspended from the springs by linkage adapted to permit relative movements both laterally and longitudinally.

A further object of this invention is to provide means whereby a car body may be suspended from the main springs of a vehicle in such a manner as to permit relative lateral and longitudinal movements at the points of connection, but in which the frame or body is connected with the sub-frame or vehicle axles in such a manner as to limit relative longitudinal movement, while allowing the desired relative vertical and lateral movements permissible by flexion of the springs and oscillation or vibration of the linkage above referred to.

The use of motor driven trucks having internal combustion engines for operating them, either along ordinary highways or along railway tracks in substitution for steam locomotives, has given rise to special problems. The comparatively light weight of such trucks and their trailers, as compared with that of ordinary railway engines and cars, makes them subject to lateral swaying movements and jolts in passing around curves, across joints, switch frogs etc., whereby the danger of derailment is increased and passengers subjected to jolts and vibratory movements which cause considerable discomfort.

This invention is designed to overcome the objections above referred to and provide a truck structure which can be readily converted from a motor driven truck adapted for travel along highways to a passenger truck for travel along a railway, either with or without auxiliary trailers, by a mere substitution of flanged wheels for the ordinary highway truck wheels.

In the drawings.

Like parts are identified by the same reference characters throughout the several views.

Figures 1, 2:
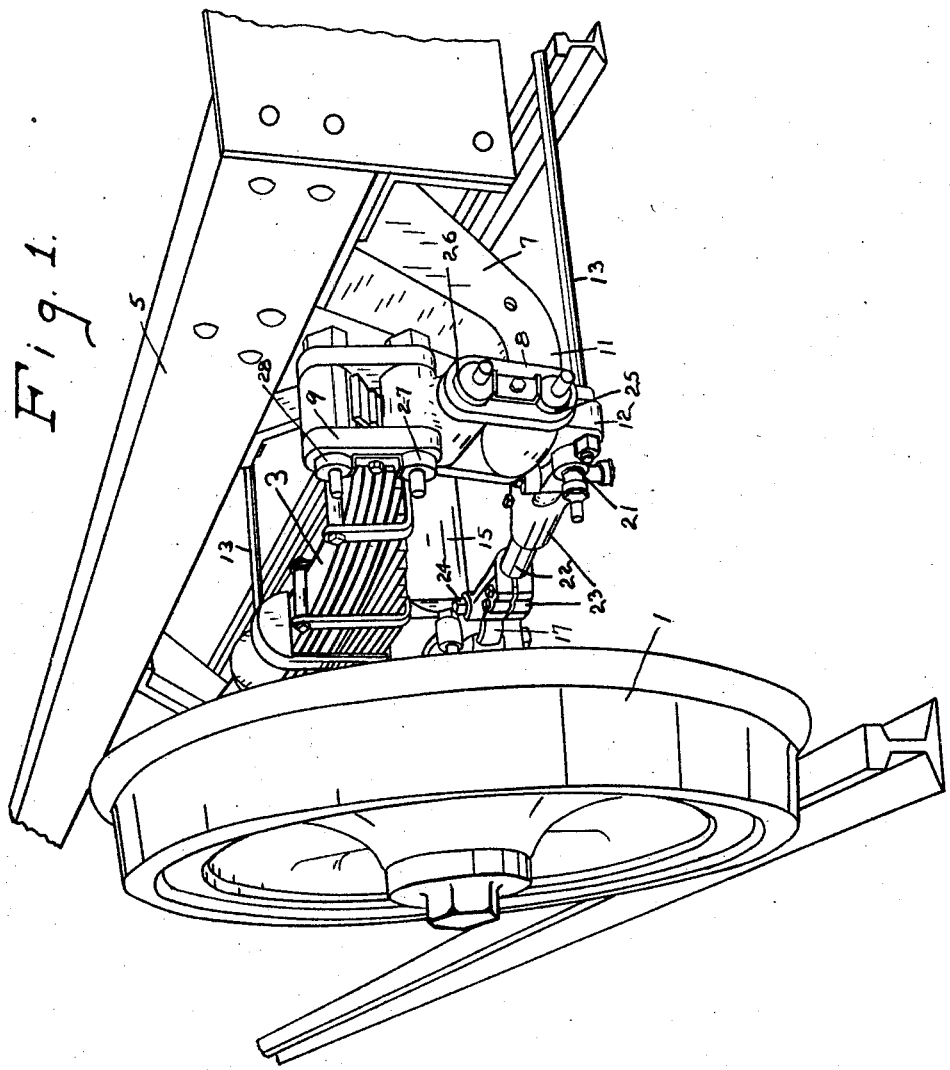
Figure 1 is a perspective view of a fragment of a truck embodying this invention as it appears when used for railway trucking purposes.
Figure 2 is a view of one of the substitute wheels employed to adapt the truck for highway travel.

It may be assumed that the truck to which this invention is applied, as illustrated in the drawings, is an ordinary truck driven by an internal combustion engine, the power of which may be applied either to all four of the wheels or to two of them in conformity with standard practice in either case. When the truck is equipped with flanged wheels 1 similar to those employed for ordinary railway cars, it is adapted to run upon a railway track. If equipped to be driven by an internal combustion engine, it may be used in substitution for an ordinary steam locomotive,—otherwise it may serve as a trailer to be drawn along the track by any type of engine or locomotive. If equipped with ordinary wheels 1ª (Figure 2), it may be operated as a highway truck or trailer. The general organization of motor driven trucks being well understood, no further description is deemed necessary except as to the spring suspension mechanism now to be described.

Figure 4:
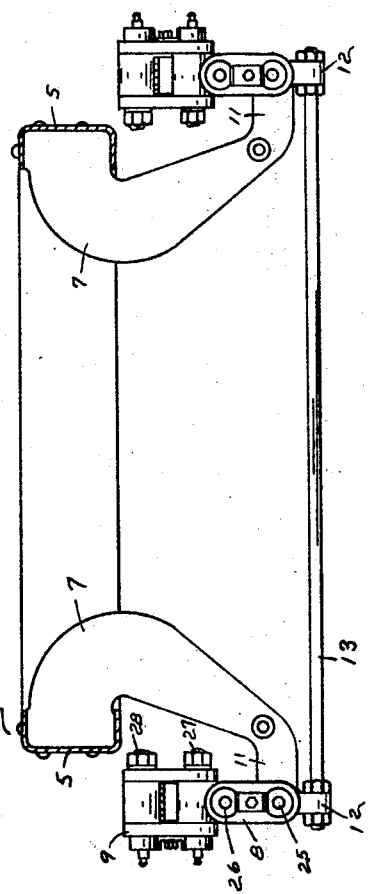
Figure 4 is a detail sectional view drawn on line 4—4 of Figure 3, with the axle omitted.

Each of the main springs 3 is connected at its respective ends with a main, or body, frame bar 5 by hangers or arms 7 and links 8 and 9. The upper end of each arm 7 is formed to fit between the upper and lower flanges of the associated main frame bar 5 and is bolted to said frame bar. The intermediate portion extends downwardly and outwardly, as clearly shown in Figure 4, and at the lower end is provided with an outwardly extending horizontal portion 11 and a depending lip 12 which is preferably connected by a cross rod 13 with the lip 12 of a similar arm at the opposite side of the main frame. The arms 7 are therefore cross connected in sets or pairs, one set in front and the other set at the rear of the associated axle. The terms "front" and "rear" are used relatively, since the vehicle may travel in either direction.

Figure 3:
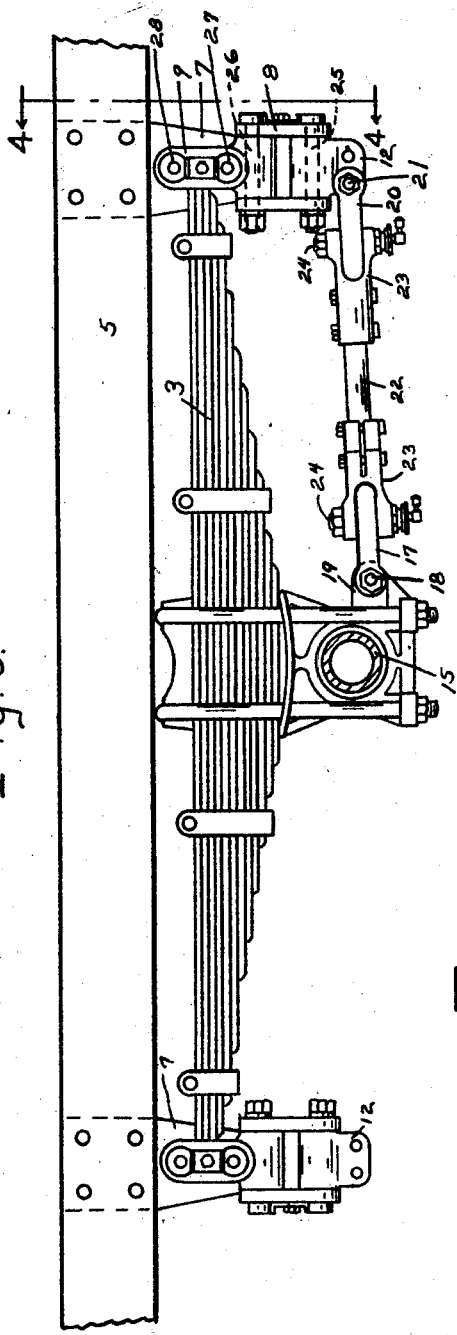
Figure 3 is a side elevation of a portion of the truck frame suspended from an associated spring and axle, the latter being shown in cross section.

Strut rods, preferably substantially parallel, connect the axle 15 with the respective lips 12 of one set of arms 7. The axle 15, shown in Figure 3, may be assumed to be the rear axle of the truck or car and the strut rods which may, for the purpose of this description, be regarded as rear axle strut rods, are shown connected to the forward set of arms 7 associated with that axle. Each of the strut rods is formed in sections provided with universal joints, or double knuckle joints, adapted to allow free vertical and lateral movements. Link section 17 is pivotally connected at 18 with the rear axle bracket 19. Link section 20 is pivotally connected with the lip 12 at 21, the pivot pins 18 and 21 being horizontally disposed. These two links are connected with each other by an intermediate section 22 having coupling members 23 provided with vertically disposed pivot pins 24 to engage the links.

As above stated, each of the hangers 7 is connected with one end of a spring 3 by the links 8 and 9. Link 8 has its pivot bolts 25 and 26 disposed longitudinally of the vehicle, whereas the pivot bolts 27 and 28 of the link 9 are disposed transversely thereto. The main leaf of the spring 3 is connected to the link 9 and is preferably hooked about the bolt 28. The link 9 is free to swing forwardly and backwardly at its upper end in accordance with the flexion of the spring 3 and any lateral movement of the axle 15 and spring 3 is permitted by the laterally swinging link 8, from the lower end of which the associated hanger and main frame is suspended. This lateral movement is free—i. e.—unopposed (within reasonable limits) by either the link 8 or by the knuckle jointed strut rods. It is obvious that when the wheels encounter the laterally flattened end of a rail or any other projection or obstruction on the road bed which tends to shift them laterally, their movement will be independent of the body in the first instance, and at most, the shock will be transmitted and distributed so as to cause only a slight swaying and substantially unnoticeable movement of the body.

Similarly, when the car is traversing a curve in the track, the body of the car is allowed to swing outwardly to a slight extent under momentum or centrifugal force without exerting an excessive pull upon the subframe and truck wheels tending to cause derailment. This pendulum swinging movement will, however, be very short, the links 8 turning upon a short radius, and the weight of the body of the car will tend to keep it centered. The permitted movement will be just sufficient to relieve strain and avoid shock, said movements being scarcely noticeable by passengers riding in the body of the car.

To secure the results above described, and to relieve the springs 3 from torsional strain, due to lateral jolts, etc., both ends of each of the respective body supporting springs 3 are connected with the main frame by hangers 7 and links 8 and 9 constructed as above described. Although, as above stated, the strut rods or radius rods are connected with only one set or pair of hangers 7.

The structure above set forth is peculiarly suited to the requirements of light trucks and trailers adapted for travel along or upon railway tracks, but motor-operated coach traffic over hard surfaced roadways is rapidly developing, and the double pendulum suspension of the body, as herein set forth, limited and controlled by the strut rods, as to longitudinal movements, and by the short radii of the links 8, as to lateral movement, contributes very materially to the comfort of the passengers. For railway traffic, the vertical movements of the frame with reference to the axles are slight, and ordinary joints in the strut rods allow sufficient play to permit the springs to flex freely. For highway travel, the strut rod sections are preferably given a greater range of extension by any well known cushioned extension joints.

I claim:—

1. The combination with a vehicle axle and body supporting springs, of a body member provided with depending rigidly formed arms, said body member being disposed above said springs and said arms extending to a position beneath the ends of said springs, and laterally and longitudinally flexible linkage suspending said arms from the adjacent end portions of said springs, the body being otherwise free to move, both vertically and laterally within the range of such movements permitted by said linkage.

2. The combination with a vehicle axle and body supporting springs, of a body member provided with depending body supporting arms, flexibly jointed connections between some of the arms and the vehicle axle adapted for both vertical and lateral flexing, and flexibly jointed linkage connecting the respective ends of the spring with the arms, said linkage having portions adapted to permit lateral flexing, and other portions adapted to permit relative longitudinal movement between each end of the spring and the associated body supporting arm, the arrangement being such as to permit a substantially free pendulum movement of the body in a laterally curving arc about the ends of the springs within the range of such movement permitted by said linkage.

3. The combination with a vehicle body and vehicle axle and a spring mounted on said axle below said body, of a rigid arm connected with said body and depending therefrom to such a position that a portion of said arm is substantially in the same horizontal plane as said axle, flexibly jointed linkage suspending said arm portion from the adjacent end of said spring, and a flexibly jointed tie member connecting said arm portion directly with said axle substantially in said plane, whereby to permit free vertical and lateral movement between said body and said axle while securing said body and axle against relative longitudinal movement.

4. The combination with a vehicle body and vehicle axle and a spring connected with said axle and having an end projecting longitudinally of said body therefrom, of a rigid arm connected with said body and depending therefrom, said arm having a laterally offset portion beneath said end of said spring, laterally and longitudinally flexible linkage connecting said arm portion with said spring end, and a link extending substantially horizontally between said arm portion and said axle and flexibly connected to each in a manner adapted to permit of relative vertical movement between said arm portion and said axle.

5. In a device of the character described, the combination with a wheel supported axle, of a frame including spaced side members disposed above said axle and projecting therebeyond, rigid brackets connected respectively with said side members beyond said axle and each including a laterally offset portion normally at substantially the level of said axle, springs above said axle and below the level of said frame, said springs having extremities projecting from said axle in the direction of said brackets, a tie member extending substantially parallel to said axle and connecting the laterally offset portions of said portions of said brackets, linkage flexible in a vertical plane connecting each of said bracket portions with adjacent portions of the axle along substantially horizontal lines, and linkage flexible laterally and longitudinally of said springs connecting the extremity of each spring with the underlying portion of an adjacent bracket, whereby to suspend said frame through said brackets from said springs for lateral and vertical movement with respect to said axle while restraining said frame from longitudinal movement with respect to said axle.

6. In a railway truck having wheels, axles, body supporting springs and body, the combination with the body, of sets of depending arms associated with the springs at the front and rear sides of the axles and compound linkage connecting the lower portions of said arms with the respective ends of the springs and adapted to permit free flexing of the springs while allowing lateral pendulum movement of the body, and flexibly jointed strut rods connecting said arms with the vehicle axle and adapted to permit both lateral and vertical movements of the body relatively to the axles.

HARRY B. DODGE.